United States Patent Office 3,347,864
Patented Oct. 17, 1967

3,347,864
PRODUCTION OF AMINOQUINOLINES
Ronald William Hinde, Ashwood, Victoria, and William George Clive Raper, Moorabbin, Victoria, Australia, assignors to Monsanto Chemicals (Australia) Limited, West Footscray, Victoria, Australia, a company of Australia
No drawing. Filed Jan. 12, 1967, Ser. No. 608,757
Claims priority, application Australia, Sept. 27, 1962, 22,633/62
6 Claims. (Cl. 260—288)

ABSTRACT OF THE DISCLOSURE

This invention pertains to the production of 8-aminoquinolines, which compounds are useful as intermediates for the production of phenanthrolines, which in turn are useful as analytical reagents, or as pharmaceutical substances, or as intermediates for the production of pharmaceutical substances. The invention provides a process for the production of aminoquinolines by the reduction of 8-nitroquinolines, with ammonium or alkali metal or alkaline earth metal hydrogen sulfide in an aqueous alcohol solvent medium at a controlled pH from 8.0 to 9.5.

This is a continuation-in-part of United States patent application Ser. No. 310,930, filed Sept. 23, 1963, now abandoned.

Many methods are known for the reduction of organic nitro compounds but by and large they all have disadvantages for the reduction of nitroquinolines to aminoquinolines, in particular the reduction of 8-nitroquinoline to 8-aminoquinolines. Thus, the use of iron and acid has been found to result in a difficult isolation of the desired product due not only to the difficulty of separation of the aminoquinoline from the iron sludge but also because these aminoquinolines will complex with iron making the separation even more difficult. Zinc and tin, in conjunction with acids, have been found to be expensive for commercial reduction of nitroquinolines; in addition, separation and recovery of the aminoquinolines is a difficulty. Stannous chloride has also been found to be too expensive in commercial production of aminoquinolines, and, again, isolation of the desired product is difficult. Sodium hydrosulfite, apart from being expensive, also has been found to give poor yields of the desired product in an impure form. Sodium bisulfite is not useful as sulfonic acid by-products are obtained, usually as the main product. Alkali metal sulfides and polysulfides are useful reducing agents, but tend to give large amounts of water-soluble impurities when used for the reduction of nitroquinolines. Yields of about 40–50% of theory normally are obtained but careful control of reaction conditions can give yields of up to 65%. Hydrazine with a catalyst is a useful method which gives the product in high yields and good purity, however, as much as four (4) moles of hydrazine have to be used to achieve this, which makes this too expensive on a commercial basis.

In accordance with the invention there is provided the method of producing aminoquinolines, in particular 8-aminoquinolines, which comprises reacting a nitroquinoline, in particular 8-nitroquinoline or an appropriately substituted 8-nitroquinoline, with an ammonium or alkali metal or alkaline earth metal hydrogen sulfide at a pH between pH 8.0 and pH 9.5 in an aqueous aliphatic alcohol solvent medium, said aliphatic alcohol having from 1 to 4 carbon atoms, until reduction of the nitroquinoline is complete or substantially complete.

More particularly, we have discovered that 8-aminoquinolines of satisfactory purity and in high yields, in the order of 85–95%, can be obtained by heating to reflux temperature or to a temperature in the vicinity of reflux for an extended period of time not less than about one-half hour, 8-nitroquinoline or an appropriately substituted 8-nitroquinoline, in an alcohol solvent as specified, containing an ammonium or alkali metal or alkaline earth metal hydrogen sulfide solution, at a pH between pH 8.0 and pH 9.5, until reduction of the nitroquinoline is complete or substantially complete.

The method of the invention is especially suitable for the production of aminoquinolines of the formula

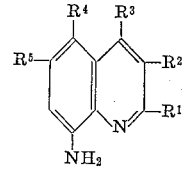

wherein $R^1$, $R^2$, $R^3$, $R^4$ and $R^5$ are substituents selected from the group consisting of hydrogen, alkyl of not more than four carbons, phenyl, tolyl and xylyl. When the substituents are alkyl the carbon atoms of the substituents total from one to fourteen carbon atoms and provided that when a substituent is tert-butyl the substituents on adjacent carbon atoms of the aminoquinoline are hydrogen. When the substituent is phenyl, tolyl and xylyl there is a maximum of two of such aromatic substituents the remaining substituents being hydrogen. The method comprises reacting a nitroquinoline of the formula

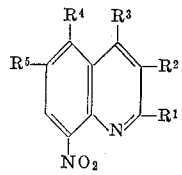

wherein $R^1$, $R^2$, $R^3$, $R^4$ and $R^5$ are as described above with a sulfide selected from the group consisting of ammonium hydrogen sulfide, alkali metal hydrogen sulfide and alkaline earth metal hydrogen sulfide. The reaction is carried out in a solvent medium of an aliphatic alcohol having a maximum of four carbon atoms and water while the pH of the reaction mixture is maintained from about 8.0 to about 9.5.

In carrying out the method of the invention the ammonium or alkali metal or alkaline earth metal hydrogen sulfide advantageously is present in the reaction mixture in the ratio of about 3 to about 4 moles per mole of nitroquinoline. More particularly, the sulfide may be a solution of hydrogen sulfide in ammonia, or, sodium or calcium or potassium hydrogen sulfide in any of the usual forms. We have found sodium hydrogen sulfide (NaHS) to be the most useful since in general it gives the desired product in good yield and good purity. Sodium hydrogen sulfide may satisfactorily be used alone, however, the control of pH within the stated range raises the yield by from 15 to 30%. Likewise, the alcohol solvent advantageously is a water-miscible aliphatic alcohol, conveniently selected from methanol, ethanol, isopropanol, n-propanol and tert.-butanol, but may be any suitable aliphatic alcohol having from 1 to 4 carbon atoms, including glycols. Ethanol is the preferred alcohol for the purpose.

Examples of suitable practical procedures are those in which the nitroquinoline is slurried or dissolved in the aqueous alcohol solvent, or in a portion of that solvent, and the solid inorganic sulfide added to the solvent solution or slurry of nitroquinoline, any remaining portion of solvent then being added to the mixture; or, a solution of the inorganic sulfide in water or in a portion of the alcohol solvent and water, is added to the solution or slurry of nitroquinoline in the alcohol; the pH is determined by any suitable means such as a pH meter; the pH of either of these mixtures being maintained between pH 8.0 and pH 9.5 throughout the solution addition and reaction periods by any suitable method or means, such as the presence of a salt of a weak base and a strong acid, or an acid salt, or the continuous controlled addition of a strong or weak acid. Alternatively, the nitroquinoline may be added to a solution of the sulfide in water and the alcohol, the pH being controlled so as to be between pH 8.0 and pH 9.5 by any of the above methods.

When the reaction is complete or substantially complete, the desired end product is isolated from the reaction mixture by any suitable well known method, the simplest procedure being to filter the solution from the insoluble by-products, add a suitable inorganic sulfide or sulfite to remove any free sulfur still present, and isolate the product by distilling off the aqueous alcohol solvent and collecting the precipitated product, or, by adding water to precipitate the product from the alcoholic solution. Decolorizing carbon or like treatment of the product before isolation may also be carried out if desired.

According to a preferred procedure, an aqueous solution of the sulfide is added to a slurry of the nitroquinoline and a pH adjusting agent at reflux temperature or at a temperature above 50° C. and the mixture held at the initial temperature for two hours. The desired end product is recovered by filtration of the solution to remove insoluble by-products, further inorganic sulfide is added to remove any free sulfur present in the filtered solution, then water is added to precipitate the desired end product, which is then isolated by filtration.

The method of the invention is relatively economical and easy to operate; the yields are generally good; the desired end product is obtained directly from the reaction mixture by crystallization; the end product obtained is usually purer than that obtained when most other methods are used; the product is sufficiently pure to use as an intermediate in phenanthroline syntheses; and, although other methods may give yields higher than those obtainable by the method of the invention, the present method is considered to be the most economical and convenient overall.

Member compounds of the 8-nitroquinoline series which may with advantage be subjected to the reduction method of the invention are selected from the group consisting of 8-nitroquinoline; 2-methyl-8-nitroquinoline; 3-isopropyl-8-nitroquinoline; 3 - tert - butyl - 8 - nitroquinoline; 2,4-dimethyl - 8 - nitroquinoline; 3,4 - dimethyl - 8 - nitroquinoline; 3,5 - dimethyl - 8 - nitroquinoline; 3 - butyl-5,6 - dimethyl - 8 - nitroquinoline; 3,4 - diethyl - 8 - nitroquinoline; 3,4,5,6 - tetramethyl - 8 - nitroquinoline; and 4-phenyl-8-nitroquinoline. In general the 8-nitroquinoline can be selected from those which, when reduced to the equivalent 8-aminoquinolines and reacted with an hydroxy ketone or derivative as hereinafter indicated, lead to the formation of 1,10-phenanthrolines including 4,7-diethyl-1,10 - phenanthroline; 5,6 - diethyl - 1,10 - phenanthroline; 3,5,6,8 - tetramethyl - 1,10 - phenanthroline; 3,4,7,8-tetramethyl - 1,10 - phenanthroline; 3,4,5,6 - tetramethyl-1,10 - phenanthroline; 3,8 - diethyl - 5,6 - dimethyl - 1,10-phenanthroline; 3,8 - dibutyl - 5,6 - dimethyl - 1,10-phenanthroline; 3,4,5,6,7,8 - hexamethyl - 1,10 - phenanthroline; 5-phenyl - 1,10 - phenanthroline; and 4,7 - diphenyl-1,10-phenanthroline.

The invention is illustrated by the following nonlimitative practical examples:

*Example I*

Ammonium chloride (53.5 gm., 1 mole) was dissolved in water (160 ml.) and 27% ammonium hydroxide solution (70 ml., 1 mole) was added. Hydrogen sulfide was bubbled into the solution until it was saturated, 24.8 gm. or 0.73 mole being absorbed.

3,4-dimethyl-8-nitroquinoline (5.05 gm., 0.025 mole) slurried in ethanol (50 ml.) was heated to 60–70° C. The $NH_3/NH_4Cl/H_2S$ solution as prepared above (38 ml., containing 0.1 mole $H_2S$) was added over 10 minutes. The mixture having a pH within the range 8.0 to 9.5 was stirred for 2 hours at 60–70° C., filtered hot and the ethanol boiled off and replaced with water. The lumpy solid obtained was isolated and redissolved in hot ethanol and a solution of $Na_2S.9H_2O$ (4 gm.) in water (10 ml.) was added. The mixture was held at 60–70° C. for 15 minutes than hot water was added to precipitate the product. The suspension was cooled, filtered and washed to give yellow crystals of 3,4-dimethyl-8-aminoquinoline (4.1 gm., 96% yield) M.P. 97–99° C.

*Example II*

3,4-dimethyl-8-nitroquinoline (5.05 gm., 0.025 mole) was slurried in ethanol (50 ml.) and ammonium chloride (10.7 gm., 0.2 mole) was added. The mixture was heated to 60–70° C. and 30% sodium hydrosulfide solution in water (15 ml., 0.1 mole) was added over 30 minutes. The mixture having a pH within the range of 8.0 to 9.5 was held at 60–70° C. for two hours and then worked up as before to give 3,4-dimethyl-8-aminoquinoline (4.0 gm., 93% yield) M.P. 96–98° C.

*Example III*

Example II was repeated except that 4-phenyl-8-nitroquinoline (0.025 mole) was used in place of the 3,4-dimethyl-8-nitroquinoline. 4-phenyl-8-aminoquinoline obtained.

*Example IV*

Example II was repeated except that $NaH_2PO_4$ (31.2 gm., 0.2 mole) was used in place of the ammonium chloride to maintain the pH within the range of 8.0 to 9.5. 3.3 gm. (77% yield) of 3,4-dimethyl-8-aminoquinoline, M.P. 98–99° C. was obtained.

*Example V*

For comparison with the above, in which the pH of the reaction mixture was controlled, Example II was repeated but omitting the ammonium chloride. A yield of 2.8 gm. (65%) M.P. 97–99° C. was obtained.

*Example VI*

2-methyl-8-nitroquinoline (7.1 g., 0.038 mole) was slurried in ethanol (70 ml.) containing powdered ammonium chloride (16.2 g.) while an aqueous solution of sodium hydrogen sulfide (30.8% w/w., 27.6 g.) was added over 30 minutes at a temperature of 65° C. The resulting solution having a pH within the range of 8.0 to 9.5 was stirred for 2 hours at 60–70° C., then animal charcoal (0.38 g.) was added and the solution was cooled to 3° C. and filtered. The filtrate was diluted with ice-water (200 ml.) and the precipitated 2-methyl-8-aminoquinoline was filtered off, washed with ethanol/water (10 ml. ethanol in 90 ml. water) and dried.

We have found that the method of the invention is particularly useful for the reduction of 8-nitroquinolines prepared by the reaction of o-nitroaniline or substituted o-nitroanilines represented by Formula I with a hydroxy ketone represented by Formula II or a corresponding β-vinyl ketone obtained by dehydration of said ketones:

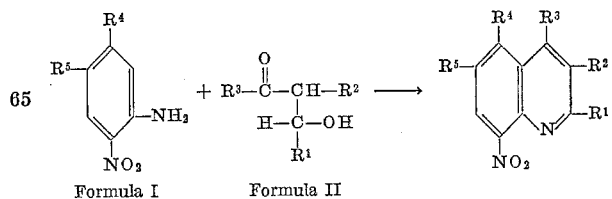

Formula I    Formula II wherein $R^1$, $R^2$, $R^3$, $R^4$ and $R^5$ are substituents selected from the group consisting of hydrogen, alkyl having a maximum of four carbon atoms, phenyl, tolyl and xylyl; provided that when the substituents are alkyl the carbon atoms of such substituents preferably total one to fourteen carbon atoms; provided that when the substituent is tert-butyl the substituents on adjacent carbon atoms of the nitroquinoline are hydrogen; further provided that when the substituent is phenyl, tolyl and xylyl there is a maximum of two of such substituents the remaining substituents being hydrogen.

The compounds represented by Formula I may be made by well known procedures for the nitration of substituted anilines to yield mainly ortho nitro anilines, such as the nitration of substituted acetanilides in acetic acid or with acetyl nitrate.

The hydroxy ketones represented by Formula II may be prepared by the reaction of formaldehyde or a formaldehyde condensation product such as paraformaldehyde with a ketone under conditions which will produce an α-hydroxy methyl ketone, but they may be prepared by other procedures if desired. Methods which are available include: reaction of aqueous formaldehyde and methyl ethyl ketone with alkaline catalyst such as sodium hydroxide or sodium carbonate (Morgan, Chem. and Ind., 57, 885 (1938)); or, reaction of paraformaldehyde and methyl ethyl ketone with alcoholic potassium hydroxide catalyst (Landau and Irany, J. Org. Chem. 12 (1947)); or, reaction of aqueous formaldehyde and methyl ethyl ketone with sodium carbonate as catalyst in a fractionating column (U.S. Patent No. 2,510,914).

The compounds represented by Formula I and Formula II are reacted together according to the known Skraup reaction, or modifications of the Skraup reaction, or reactions related to the Skraup reaction.

More particularly, we have found that the method of the invention is useful for the reduction of 8-nitroquinolines prepared by the method wherein a nitroaniline as specified in Formula I above is reacted with an hydroxy ketone as specified in Formula II above or a corresponding β-vinyl ketone obtained by dehydration of said hydroxy ketones, by heating said nitroaniline with a mixture of acids selected from arsenic acid/sulfuric acid mixtures and arsenic acid/phosphoric acid mixtures to a temperature in the range of 115° C. to 130° C., then adding said hydroxy ketone or corresponding β-vinyl ketone to such reaction mixture and maintaining the temperature substantially constant during the addition of said hydroxy ketone or corresponding β-vinyl ketone. The temperature range within which the reaction mixture is maintained preferably is about 120° C. to about 125° C. Control of the reaction temperature is conveniently obtained by very slowly adding the hydroxy ketone or corresponding β-vinyl ketone to the reaction mixture accompanied by efficient stirring of the mixture of reaction components.

In the production of 8-nitroquinoline as described, we prefer to use phosphoric acid in conjunction with the arsenic acid, although sulfuric acid may be used if desired. Concentrated sulfuric acid of commerce, which is about 98%, is normally used, but it is not essential that it be this concentration. The phosphoric acid is most conveniently the commercial material, which is approximately 85–90%, however, it is not essential that it be this concentration. Similarly, the 80% w./w. arsenic acid of commerce may be used but it is not essential that it be this concentration. In general, the concentrations of these acids are conveniently such that the reaction mixture contains about 10% water in the preparation of the 8-nitroquinoline. The ratio of arsenic acid to phosphoric acid or sulfuric acid advantageously is in the range of about 1:1 to about 1:15, the arsenic acid/sulfuric acid mixture preferably being in the lower end of the range, conveniently 1:1 to 1:5, and the arsenic acid/phosphoric acid mixture preferably being in the higher end of the range, conveniently 1:5 to 1:15, respectively.

Efficient stirring during the addition of the hydroxy ketone or corresponding β-vinyl ketone prevents any delayed reaction which could result in a sudden temperature rise. Addition of the hydroxy ketone or corresponding β-vinyl ketone preferably takes about one-half to about one hour; longer times may be taken if desired. Upon completing the addition of the hydroxy ketone or corresponding β-vinyl ketone, heating of the reaction components is continued to complete the reaction. At this stage the temperature may, if desired, be raised to 135° C.–140° C. This heating is usually continued for one to two hours. Isolation of the desired end product is most readily carried out by quenching the reaction mass into water, filtering if desired, and basifying to precipitate the nitroquinoline, however, other known procedures may be utilized. Purification of the nitroquinolines by known recrystallization procedure is usually preferred and gives a satisfactory product in most cases.

The following non-limitative practical examples illustrate preparation of 8-nitroquinolines for the purpose of the present disclosure:

Example VII 630 g. of 90% phosphoric acid, 72 g. of 80% arsenic acid and 50 g. of o-nitroaniline were heated to 120° C., and 55.5 g. of 1-hydroxy-2-methyl-butan-3-one was slowly run in, taking 45 minutes, while the temperature was held at 120° C. with efficient stirring. When the addition was complete, the temperature was raised to 135° C. and held there for two hours. The batch was cooled and quenched into water and made alkaline with concentrated ammonia solution. The product was separated by filtering, dried and recrystallized from benzene. Yield of 3,4-dimethyl-8-nitroquinoline was 41 g. (56%) melting at 150–152° C. In comparison, Case (J.A.C.S. 71 1828 (1949)) obtained a 23% yield, the product having a melting point 149–150° C.

Example VIII

A mixture of 66.4 g. of 4,5-dimethyl-2-nitroaniline, 72 ml. arsenic acid (80%) and 400 ml. (89%) phosphoric acid was heated to 115° C. and stirred. 49 g. 1-hydroxy-2-methyl-butan-3-one was added dropwise keeping the temperature about 120° C. The reaction mixture was then heated for two hours. The product was isolated as in Example VI to yield 3,4,5,6-tetramethyl-8-nitroquinoline, previously unknown, in 35% yield, melting point, on recrystallization 210° C. Microanalysis gave the following results:

$C_{13}H_{14}N_2O_2$, requires: C, 67.80; H, 6.13; N, 12.17. Found: C, 67.56; H, 5.91; N, 12.08.

Accordingly, there is provided the method which comprises reacting o-nitroaniline or a substituted o-nitroaniline represented by Formula I above, with an hydroxy ketone represented by Formula II above or a corresponding β-vinyl ketone obtained by dehydration of said hydroxy ketones, by heating said nitroaniline with a mixture of acids selected from the arsenic acid-sulfuric acid mixtures and arsenic acid-phosphoric acid mixtures to a temperature in the range of 115° C.–130° C., then adding said hydroxy ketone or corresponding β-vinyl ketone to such reaction mixture and maintaining the temperature substantially constant during the addition of said hydroxy ketone or corresponding β-vinyl ketone, carrying the reaction to completion or substantial completion by suitable heating, recovering the 8-nitroquinoline from the reaction mass, reacting the 8-nitroquinoline with an ammonium of alkali metal or alkaline earth metal hydrogen sulfide at a pH between pH 8.0 and pH 9.5 in an aqueous aliphatic alcohol solvent medium, said aliphatic alcohol having from 1 to 4 carbon atoms, until reduction of the nitroquinoline is complete or substantially complete, and recovering the 8-aminoquinoline. The preparation of the 8-nitroquinoline and the subsequent reduction of the 8-nitroquinoline to the 8-aminoquinoline may be conducted in accordance with the details of operation described above.

Although the invention is described by specific examples, it is not intended that the details thereof should be limitative except to the extent that they are encountered in the following claims.

The embodiments of the invention in which an exclusive property or privilege is claimed are defined as follows:

1. The method of preparing an aminoquinoline of the formula:

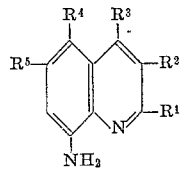

wherein $R^1$, $R^2$, $R^3$, $R^4$ and $R^5$ are substituents each selected from the group consisting of hydrogen, alkyl of not more than four carbons, phenyl, tolyl and xylyl with a maximum of two of the substituents being phenyl, tolyl and xylyl; provided that when the substituents are alkyl or hydrogen the carbon atoms of the substituents total a maximum of 14; provided that when any of the substituents is tert-butyl the substituents on adjacent carbons of the aminoquinoline are hydrogen; and provided that when the substituents are phenyl, tolyl and xylyl the remaining substituents are hydrogen; which comprises reacting a nitroquinoline of the formula

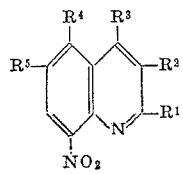

wherein $R^1$, $R^2$, $R^3$, $R^4$ and $R^5$ are as defined above, with a sulfide selected from the group consisting of ammonium hydrogen sulfide, alkali metal hydrogen sulfide and alkaline earth metal hydrogen sulfide, in a solvent medium comprising water and an alkyl or alkenyl alcohol having a maximum of four carbon atoms, at a pH from about 8.0 to about 9.5.

2. A method in accordance with claim 1 wherein said alcohol is selected from the group consisting of methanol, ethanol, n-propanol, isopropanol and tert-butanol.

3. A method in accordance with claim 1 wherein said sulfide is an alkali metal hydrogen sulfide.

4. A method in accordance with claim 1 wherein said sulfide is ammonium hydrogen sulfide.

5. A method in accordance with claim 1 wherein said nitroquinoline is selected from the group consisting of 8-nitroquinoline; 2-methyl-8-nitroquinoline; 3-isopropyl-8-nitroquinoline; 2,4-dimethyl-8-nitroquinoline; 3,4-dimethyl-8-nitroquinoline; 3,5-dimethyl-8 - nitroquinoline; 3,4-diethyl-8-nitroquinoline; 3,4,5,6-tetramethyl-8 - nitroquinoline and 4-phenyl-8-nitroquinoline.

6. A method in accordance with claim 1 wherein the pH is maintained by the presence in the reaction mixture of an acidic salt.

References Cited
UNITED STATES PATENTS

| | | | |
|---|---|---|---|
| 2,464,044 | 3/1949 | Kamlet | 260—689 X |
| 2,464,194 | 3/1949 | Zimmerman | 260—689 X |
| 2,640,830 | 6/1953 | Druey | 260—288 |
| 3,007,966 | 11/1961 | Huey | 260—689 X |

ALEX MAZEL, *Primary Examiner.*

D. G. DAUS, *Assistant Examiner.*